(No Model.)
J. C. McCOLLUM.
NAILLESS HORSESHOE.
No. 517,013. Patented Mar. 20, 1894.
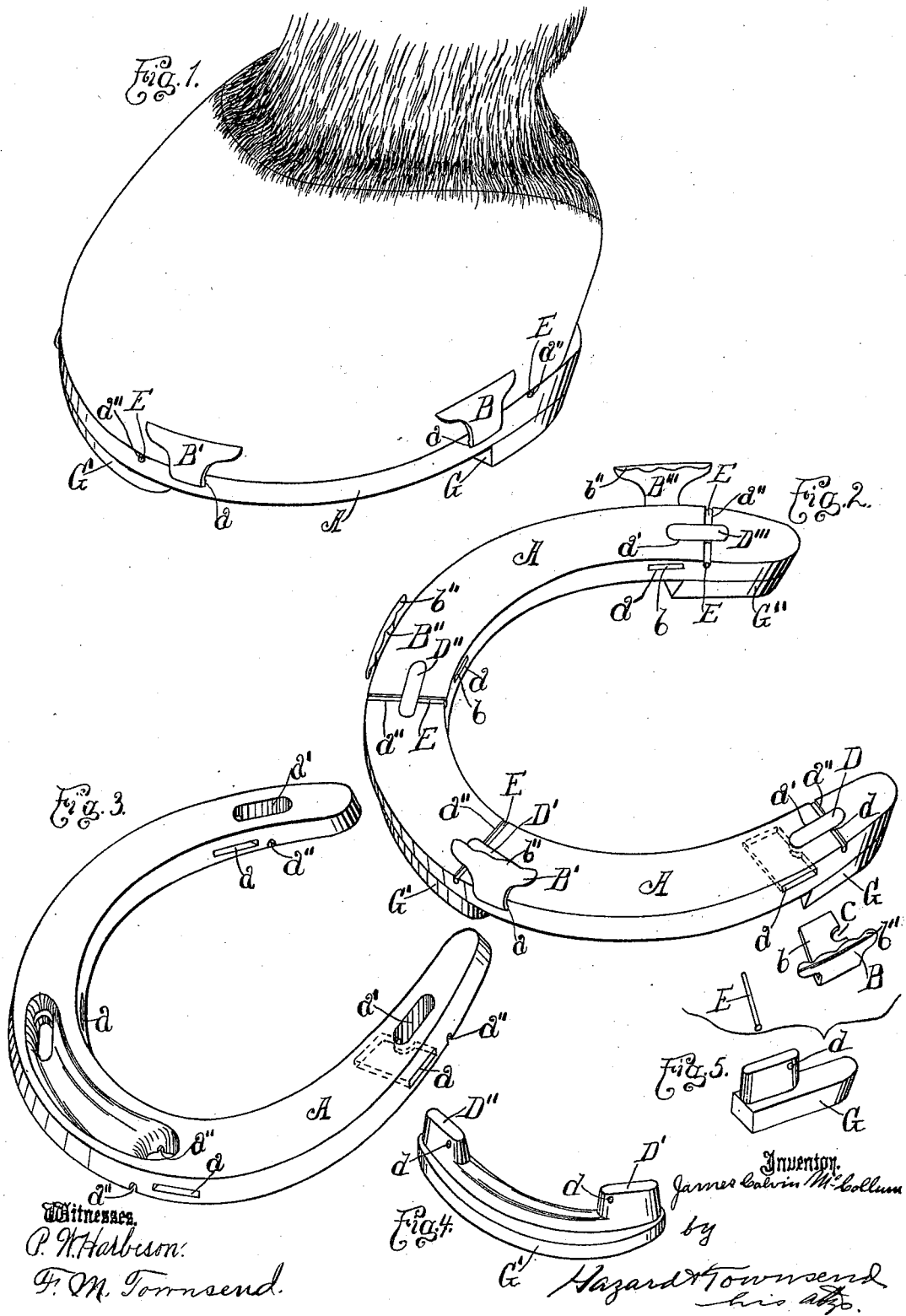

UNITED STATES PATENT OFFICE.

JAMES CALVIN McCOLLUM, OF LONG BEACH, CALIFORNIA, ASSIGNOR OF TWO-THIRDS TO ALBERT H. JUDSON AND CHARLES W. SEAMANS, OF SAME PLACE.

NAILLESS HORSESHOE.

SPECIFICATION forming part of Letters Patent No. 517,013, dated March 20, 1894.

Application filed March 20, 1893. Serial No. 466,753. (No model.)

*To all whom it may concern:*

Be it known that I, JAMES CALVIN MCCOLLUM, a citizen of the United States, residing at Long Beach, in the county of Los Angeles and State of California, have invented a new and useful Nailless Horseshoe, of which the following is a specification.

The object of my invention is to produce a nailless horseshoe which can be easily and quickly secured to the hoof of the horse and which will be free from rattling and which can be conveniently and easily removed from the horse's hoof when desired. Also to provide means whereby the shoe may be supplied with new calks when desired.

The accompanying drawings illustrate my invention.

Figure 1 is a perspective view showing my improved horse-shoe secured in place upon the horse's hoof. Fig. 2 is a perspective view of the horse-shoe removed and one of the clamp bits and its securing pin also removed; but showing the clamp securing bolt in place. It is to be understood that the bolt D must be removed from the position shown in Fig. 2 before the clamp bit can be placed in position. Fig. 3 is a perspective view of the under side of the horse-shoe with the bits and their securing bolts removed. Fig. 4 is a view of the toe clamp securing bolts fixed to a toe piece or calk. Fig. 5 is a perspective view of one of the heel clamp bit securing bolts with a heel calk fixed thereto.

My invention consists essentially in a horse-shoe comprising a main body or shoe proper, A, and a series of hoof clamping bits B B', &c., adapted and arranged to be secured to the shoe at its outer rim, and suitable means arranged to prevent the lateral displacement of such clamp bits.

It also comprises a horse-shoe having its main body A provided with hoof clamping bits and with a lateral clamp bit shank socket $a$ arranged to intersect one side of the bolt receiving opening $a'$; a clamp bit B provided with a shank $b$ provided with a bolt receiving opening $c$; a suitable bolt D provided with a pin receiving socket $d$ and arranged to fit into the bolt receiving opening $a'$ when the shank $b$ is inserted into the shank receiving socket $a$, and suitable means for securing the bolt in its socket, such as a pin E adapted and arranged to fit into the pin socket $d$ to secure the bolt within the bolt socket $a'$.

In practice the top side of the shoe is provided with grooves $a''$ to seat the pin E; and the sockets $a$ $a'$ and $c$ are so arranged that when the shank $b$ is inserted in place, the notch or opening $c$ will coincide with the socket $a'$ so that the bolt can be inserted into the bolt socket $a'$ and will fit within the notch $c$ thus holding the shank $b$ against withdrawal; and the pin receiving hole $d$ and the pin receiving notch $a''$ are arranged so that when the bolt is fully inserted into the bolt receiving socket $a'$ the pin receiving hole and notch will coincide so that the pin can be inserted in the notch $a''$ and passed through the hole $d$ thereby to engage the body of the shoe and secure the bolt D against withdrawal. The bolt D and the pin E and their sockets are preferably slightly tapered so that when they are fully seated there will be no play between the parts. The shoe is properly supplied with four clamp bits B B' B'' B''' which are arranged two at the heels (one at each heel) and two at the toe of the shoe. The bolts D D' D'' D''' which secure these clamp bits in place are preferably provided with the shoe calks G G' and G''. The heel bolts D D''' are provided respectively with the heel calks G G'' and the two toe bolts D' and D'' are provided with the toe calk G' which is secured at its ends respectively to the toe bolts. The calks and their respective bolts are formed integral with each other. The clamps are provided with suitable inwardly projecting teeth $b''$ adapted to set into the horse's hoof when the clamps are set in position.

In practice the shoe is first nicely fitted to the hoof which is trimmed for that purpose and when so fitted the clamp bits B' B'' are secured in place and the shoe is placed upon the horse's hoof after which the rear clamp bits B and B''' are set in position, being pressed by means of a thumb clamp to force the teeth $b''$ into the hoof; and when properly set the bolts D D''' are set in place to secure the clamp bits and they in turn are secured in place by the pins E. To remove the shoe the pins E are driven out and the bolts are removed and the clamp bits are then withdrawn, thus releasing the shoe. The same main body of the shoe A will outlast a number of the calks and when the calks are worn they may be replaced from time to time without destroying the main body of the shoe.

It will be understood from the above description that the toe clamps and one heel clamp may be fixed to the shoe by means other than those described for the reason that the final clamping is accomplished by the last heel clamp fixed in position and I therefore do not limit my claim to a shoe having all of its clamps attached in the manner shown.

Now, having described my invention, what I claim as new, and desire to secure by Letters Patent, is—

1. A horse-shoe having hoof clamping bits and having its main body provided with the lateral clamp-bit-shank-socket and with the bolt socket arranged to intersect one side of the clamp-bit-shank socket; the clamp-bit provided with the shank having the bolt receiving opening; a suitable bolt arranged to fit into the bolt socket and the bolt receiving opening of the bit shank when the shank is inserted into the shank socket, and suitable means adapted and arranged to secure the bolt within the bolt socket.

2. A horse-shoe having hoof clamping bits and having its main body provided with a lateral clamp-bit-shank socket and with the bolt socket arranged to intersect one side of the clamp bit shank socket; the clamp bit provided with a bolt receiving opening; a suitable bolt provided with the pin receiving socket and arranged to fit into the bolt socket and the bolt receiving opening when the shank is inserted into the shank receiving socket, and a pin adapted and arranged to fit into the pin receiving socket to engage the body of the shoe to secure the bolt in the bolt receiving socket.

3. A horse-shoe having hoof clamping bits and having its main body provided with a lateral clamp-bit-shank socket and with a bolt socket arranged to intersect one side of the clamp-bit-shank socket; a clamp-bit provided with a securing shank provided with a bolt receiving opening, a suitable bolt provided with a calk and arranged to fit into the bolt receiving opening of the clamp bit shank when the shank is inserted into the shank receiving socket, and suitable means arranged to secure the bolt within the bolt receiving socket.

4. A horse shoe having hoof clamping bits and having its main body provided with the lateral clamp-bit-shank socket and with the bolt socket arranged to intersect one side of the clamp bit socket; the clamp-bit provided with the shank provided with the bolt receiving opening; a suitable bolt provided with the calk and with the pin receiving socket and arranged to fit into the bolt socket and the bolt receiving opening when the shank is inserted into the shank socket, and a pin adapted and arranged to fit into the pin receiving socket to engage the body of the shoe to secure the bolt in the bolt socket.

5. A horseshoe having suitable heel clamps and provided at its toe with two shank sockets and intersecting bolt sockets, the two toe clamps set in such clamp sockets, said clamp sockets being provided with the bolt receiving openings, a toe calk provided with two clamp securing bolts set in the bolt sockets and bolt receiving openings, and suitable means arranged to secure the bolts in the sockets.

JAMES CALVIN McCOLLUM.

Witnesses:
JAMES R. TOWNSEND,
ALFRED I. TOWNSEND.